(12) United States Patent
Ge et al.

(10) Patent No.: US 11,338,508 B2
(45) Date of Patent: May 24, 2022

(54) BUILD MATERIAL PARTICLE FUSING IN A CHAMBER CONTAINING VAPOR

(71) Applicant: HEWLETT-PACKARD DEVELOPMENT COMPANY, L.P., Houston, TX (US)

(72) Inventors: Ning Ge, Palo Alto, CA (US); Steven J. Simske, Ft. Collins, CO (US); Andrew E. Fitzhugh, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 877 days.

(21) Appl. No.: 16/075,672

(22) PCT Filed: Jan. 31, 2017

(86) PCT No.: PCT/US2017/015867
§ 371 (c)(1),
(2) Date: Aug. 6, 2018

(87) PCT Pub. No.: WO2018/143954
PCT Pub. Date: Aug. 9, 2018

(65) Prior Publication Data
US 2021/0268727 A1    Sep. 2, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/214* (2017.08); *B29C 64/245* (2017.08); *B29C 64/286* (2017.08); *B29C 64/357* (2017.08); *B29C 64/371* (2017.08); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

| 3,266,306 A * | 8/1966 | Arnold ................. G01N 17/00 73/150 R |
| 9,327,450 B2 | 5/2016 | Hein et al. |

(Continued)

FOREIGN PATENT DOCUMENTS

| WO | 2015200189 A1 | 12/2015 |
| WO | 2016024863 A1 | 2/2016 |
| WO | 2016112224 A1 | 7/2016 |

*Primary Examiner* — Matthew J Daniels
*Assistant Examiner* — Paul Spiel
(74) *Attorney, Agent, or Firm* — Mannava & Kang

(57) ABSTRACT

According to an example, an apparatus may include an agent delivery device to selectively deliver an agent onto a layer of build material particles. The apparatus may also include an energy source to apply energy onto the layer of build material particles to selectively fuse the build material particles in the layer based upon the locations at which the agent was delivered and a chamber formed of a plurality of walls, in which the agent delivery device and the energy source are housed inside the chamber. The apparatus may further include a vapor source to supply vapor into the chamber to wet the build material particles inside the chamber.

15 Claims, 4 Drawing Sheets

(51) Int. Cl.
  *B33Y 30/00*   (2015.01)
  *B33Y 40/00*   (2020.01)
  *B29C 64/357*  (2017.01)
  *B29C 64/371*  (2017.01)
  *B29C 64/214*  (2017.01)
  *B29C 64/245*  (2017.01)
  *B29C 64/286*  (2017.01)

(56) References Cited

U.S. PATENT DOCUMENTS

| | | |
|---|---|---|
| 2007/0074659 A1 | 4/2007 | Wahlstrom |
| 2013/0233244 A1 | 9/2013 | Forrest et al. |
| 2014/0322501 A1* | 10/2014 | Ederer ............... B28B 1/16 |
| | | 428/206 |
| 2015/0266241 A1 | 9/2015 | Batchelder |
| 2016/0159113 A1 | 6/2016 | Ko et al. |
| 2016/0271874 A1 | 9/2016 | Tsai et al. |
| 2017/0106595 A1* | 4/2017 | Gunther ............ B33Y 10/00 |
| 2017/0341018 A1* | 11/2017 | She ................... B01D 53/30 |
| 2018/0158603 A1* | 6/2018 | Craft ................. B33Y 70/00 |

* cited by examiner

BUILD MATERIAL PARTICLE FUSING IN A CHAMBER CONTAINING VAPOR

BACKGROUND 3D manufacturing apparatuses that employ additive manufacturing techniques to build or print parts are gaining in popularity and use. Some additive manufacturing techniques employ a layering process in which particles of build material are spread into a layer and selectively fused together. Following that process, additional particles are spread into another layer and selectively fused together. This process is repeated for a number of times to build up a 3D part having a desired configuration.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are apparatuses and methods for forming 3D printed parts in a chamber into which vapor may be supplied. Particularly, disclosed herein are apparatuses and methods in which build material particles are fused together inside of a chamber while vapor is supplied onto the build material particles to wet the build material particles during the fusing process. In some examples, the vapor may be sprayed directly onto the build material particles prior to fusing operations being performed on the build material particles.

Wetting of the build material particles with vapor as disclosed herein may reduce displacement of the build material particles from layers of build material particles, which may reduce entry of the build material particles into the slots of fluid or agent delivery devices of a 3D printer. As such, wetting of the build material particles with vapor may reduce clogging of the delivery device slots, which may improve functioning and the life spans of the delivery devices. In another regard, wetting of the build material particles may reduce local hot spots in the layer of build material particles, which may result in improved 3D part building quality. In another regard, wetting of the build material particles with vapor as disclosed herein may reduce the potential for the build material particles from catching fire or exploding, which may occur with the dry build material particles due to their small sizes and exposure to high temperatures during the 3D part fabrication processes. In a further regard, wetting of the build material particles with vapor as disclosed herein may reduce electrostatic interactions between the particles as the vapor may help to discharge the electrostatic charges that may otherwise form between the particles. Discharging the electrostatic charges between the particles may reduce adhesion between the particles, which may assist in the ability to reuse or recycle unfused particles.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1A:
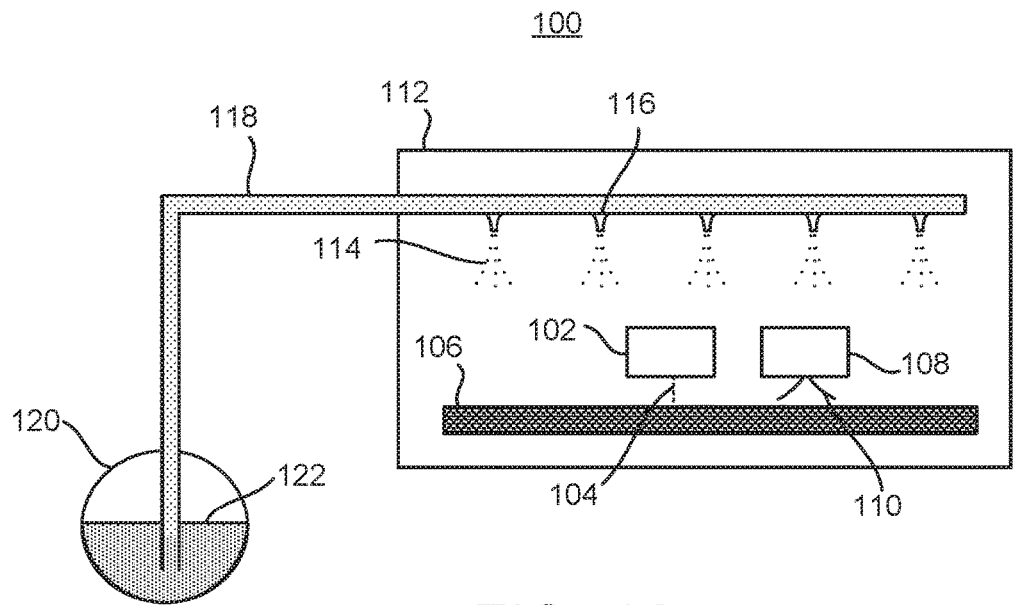
FIGS. 1A and 1B respectively show simplified block diagrams of example apparatuses that may include components to selectively fuse build material particles in the presence of vapor.
Figure 1B:
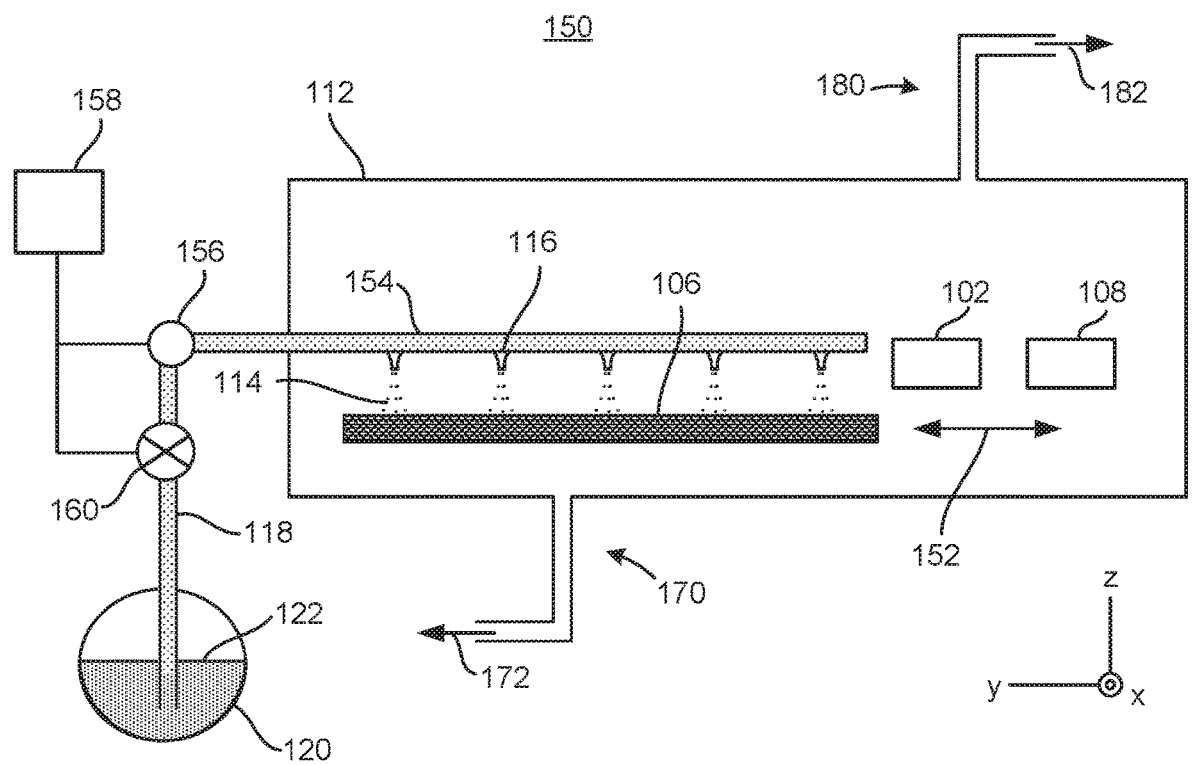

FIGS. 1A and 1B respectively show simplified block diagrams of example apparatuses 100, 150 that may include components to selectively fuse build material particles in the presence of vapor. It should be understood that the apparatuses 100, 150 depicted in FIGS. 1A and 1B may include additional components and that some of the components described herein may be removed and/or modified without departing from the scopes of the apparatuses 100, 150 disclosed herein.

With reference first to FIG. 1A, the apparatus 100 may include an agent delivery device 102 that may selectively deliver an agent 104 onto a layer of build material particles 106. In various examples, the agent delivery device 102 may be a printhead having actuators, e.g., thermal inkjet resistors, piezoelectric actuators, or the like, to eject the agent 104 from firing chambers for selective delivery of the agent 104 onto the build material particles 106 and the agent 104 may be an printing liquid. By way of particular example, the agent 104 may be a fusing agent, a detailing agent, etc. Particularly, a fusing agent may be a substance that is to absorb fusing radiation (e.g., in the form of light and/or heat) to cause the build material particles 106 upon which the fusing agent has been deposited to fuse together when fusing radiation is applied onto the fusing agent and the build material particles 106. A detailing agent may be a substance that may absorb significantly less of the fusing radiation as compared with the fusing agent. In one example, the detailing agent may prevent or significantly reduce the fusing together of the build material particles 106 upon which the detailing agent has been deposited during application of fusing radiation onto the detailing agent and the build material particles 106.

In examples in which the agent 104 is a fusing agent, the agent delivery device 102 may be controlled to deliver the agent 104 onto the build material particles 106 that are located in areas of the layer that are to be fused together. In examples in which the agent 104 is a detailing agent, the agent delivery device 102 may be controlled to deliver the agent 104 onto build material particles 106 that are located in areas of the layer that are to remain unfused from each other. In other examples, the agent delivery device 102 may include multiple delivery devices, in which one of the delivery devices may deliver a fusing agent and another one of the delivery devices may deliver a detailing agent. In any regard, 3D objects or parts may be generated from the build material particles 106 and the build material particles 106 may be formed of any suitable material including, but not limited to, polymers, metals, and ceramics. In addition, the build material particles 106 may be in the form of a dry powder.

The apparatus 100 may also include an energy source 108 that is to apply energy 110 onto the layer of build material particles 106 to selectively fuse the build material particles 106 in the layer based upon the locations at which the agent 104 was delivered. That is, following deposition of the agent 104 onto selected areas of the layer of build material particles 106, the energy source 108 may be implemented to apply energy 110, e.g., fusing radiation, onto the build material particles 106. Particularly, for instance, the energy source 108 may be activated and moved across the layer of build material particles 106 to apply fusing radiation in the form of light and/or heat onto the build material particles 106. Examples of the energy source 108 may include a UV, IR or near-IR curing lamp, an IR or near-IR light emitting diode (LED), a halogen lamp emitting in the visible and near-IR range, or a laser with desirable electromagnetic wavelengths. According to an example, the agent delivery device 102 and the energy source 108 may be supported on a carriage (not shown) that may be scanned over the layer of build material particles 106 to enable the agent 104 to be deposited and the energy 110 to be applied over most of the layer of build material particles 106.

In examples in which the agent 104 is a fusing agent, application of the energy 110 may result in the build material particles 106 upon which the agent 104 has been deposited to be heated above their melting temperatures through enhancement of heat absorption by the fusing agent. These build material particles 106 may thus melt and may fuse together when cooled. In examples in which the agent 104 is a detailing agent, application of the energy 110 may result in the build material particles 106 upon which the agent 104 has been deposited to remain below their melting temperatures through limiting of heat absorption by the detailing agent. In these examples, the energy 110 may be of sufficient strength to cause the build material particles 106 that have not received the detailing agent to melt and subsequently fuse together.

The apparatus 100 may further include a chamber 112 formed of a plurality of walls. According to examples, the chamber 112 may be sealed from an external environment or may partially be sealed from the external environment. Thus, for instance, the chamber 112 may have six sides, e.g., four walls, a floor, and ceiling, in which each of the sides may be closed or partially open. In any regard, the agent delivery device 102, the build material particles 106, and the energy source 108 may be housed inside the chamber 112.

According to examples, the interior of the chamber 112 may be supplied with a vapor 114. The vapor 114 may be a water vapor (e.g., steam), a gas (e.g., a noble gas), or the like. In addition or in other examples, the vapor 114 may be composed of particles of a non-caustic and non-corrosive material. Thus, for instance, the vapor 114 may prevent oxidation of the components housed in the chamber 112. In still other examples, the vapor 114 may include reagents that may provide additional effects on the build material particles 106, e.g., control other material properties of the fused build material particles 106. The vapor 114 may also be at a temperature that is near the temperature at which the build material particles 106 are maintained prior to application of energy 110 by the energy source 108 such that that vapor 114 does not significantly prevent or hinder selective fusing of the build material particles 106. Additionally, the vapor 114 may be cooler than local hot spots that may form in the layer of build material particles 106 and thus, the vapor 114 may act to remove the local hot spots.

In any case, the vapor 114 may be supplied into the chamber 112 to wet the build material particles 106. In the example shown, the vapor 114 may be supplied into the chamber 112 above the agent delivery device 102 and the energy source 108. In this example, the agent delivery device 102 and the energy source 108 may be moved such that the agent delivery device 102 and the energy source 108 are not directly between the nozzles 116 and the layer of build material particles 106 during application of the vapor 114 on the layer of build material particles 106. In other examples, the nozzles 116 may be positioned between the agent delivery device 102 and the energy source 108 and the layer of build material particles 106 or adjacent to the agent delivery device 102. In these examples, the nozzles 116 may be provided on a movable device such that the nozzles 116 may be moved out of the way of the agent delivery device 102 and the energy source 108 during agent delivery and energy application processes. By way of particular example, the vapor 114 may be supplied onto the build material particles 106 each time a new layer of build material particles 106 is formed and prior to delivery of agent and application of fusing energy.

In one regard, wetting the build material particles 106 with the vapor 114 may reduce displacement of the build material particles 106 from the layer, which may reduce entry of the build material particles 106 into slots in the agent delivery device 102 through which an agent 104 is delivered. As such, wetting the build material particles 106 with the vapor 114 may reduce clogging of the agent delivery device 102 slots, which may improve functioning and the life of the agent delivery device 102. In another regard, wetting the build material particles 106 with the vapor 114 may reduce the potential for the build material particles 106 from catching fire or exploding, which may occur with dry particles 106 due to their small sizes, e.g., between about 20 microns to about 80 microns, and exposure to high temperatures, e.g., over 160° C., during the 3D part fabrication processes. In a further regard, wetting the build material particles 106 with the vapor 114 may reduce electrostatic interactions between the particles 106 as the vapor 114 may help to discharge the electrostatic charges that may otherwise form between the particles 106. Discharging the electrostatic charges between the particles 106 may reduce adhesion between the particles 106, which may assist in the ability to reuse or recycle unfused particles 106.

As further shown in FIG. 1A, the vapor 114 may be supplied into the chamber 112 through a plurality of nozzles 116. The nozzles 116 may supply the vapor 114 into the chamber 112 in the form of a spray or a mist. In addition, the vapor 114 may be supplied to the nozzles 116 through a conduit 118, which may be in fluid communication with a vapor source 120. The vapor source 120 may be a boiler or other device that is to vaporize a liquid material 122. The vapor source 120 may also include a compressor such that the chamber 112 may become pressurized through introduction of the vapor 114 into the chamber 112, for instance, when the chamber 112 is closed or semi-closed.

Turning now to FIG. 1B, the apparatus 150 may include many of the same components as the apparatus 100 depicted in FIG. 1A. As such, the common components are not described again in detail with respect to FIG. 1B. Instead, it should be understood that the descriptions of the common elements provided above with respect to FIG. 1A are intended to also describe those elements with respect to FIG. 1B.

In the apparatus 150, the agent delivery device 102 and the energy source 108 are depicted as being positioned away from the layer of build material particles 106. That is, the agent delivery device 102 and the energy source 108 may be movable as indicated by the arrow 152 between positions in which the agent delivery device 102 deposits on and does not deposit on the layer of build material particles 106 and the energy source 108 applies energy on and does not apply energy on the layer of build material particles 106. In one regard, the agent delivery device 102 and the energy source 108 may be moved away from the layer of build material particles 106 between printing/heating passes, during formation of additional layers of build material particles 106, during cleaning operations of the agent delivery device 102, etc.

In some examples, including the example depicted in FIG. 1B, the agent delivery device 102 and the energy source 108 may be moved away from the layer of build material particles 106 to enable vapor 114 to be directly applied onto the layer of build material particles 106. That is, for instance, while the agent delivery device 102 and the energy source 108 are moved away from the layer of build material particles 106, the nozzles 116 may be positioned in relatively close proximity to the layer of build material particles 106 and vapor 114 may be sprayed directly onto the layer of build material particles 106. By way of example, the vapor 114 may be sprayed onto each new layer of build material particles 106, e.g., between successive printing/fusing operations. In other examples, the vapor 114 may be sprayed onto the layer of build material particles 106 after a predetermined number of layers have been formed, e.g., between a certain number of printing/fusing operations.

In any regard, a section 154 of the conduit 118 containing the nozzles 116 may be movable such that the section 154 of the conduit 118 may be moved away from the layer of build material particles 106. In this regard, the section 154 of the conduit 118 may be connected to the remaining section of the conduit 118 via a movable, e.g., rotatable, translatable, etc., connector 156. The connector 156 may enable the section 154 to be moved in the x, y, or z directions with respect to the layer of build material particles 106. With the section 154 moved, the agent delivery device 102 and the energy source 108 may be moved over the layer of build material particles 106 as discussed herein.

According to examples, the connector 156 may be a motorized connector that a controller 158 may control along with the agent delivery device 102 and the energy source 108. The controller 156 may be a computing device, a semiconductor-based microprocessor, a central processing unit (CPU), an application specific integrated circuit (ASIC), a graphics processing unit (GPU), a field programmable gate array (FPGA) and/or other hardware device. The controller 156 may be part of the apparatus 150 or may be separate from the apparatus 150.

The controller 156 may also control a valve 160 that may variably control delivery of the vapor 114 from the vapor source 120 to the interior of the chamber 112. For instance, through control of the valve 160, the controller 156 may control the volume of vapor 114 being supplied to the nozzles 116, the timing at which the vapor 114 is supplied to the nozzles 116, the pressure inside the chamber 112, etc. By way of example, the controller 156 may control the valve 160 to cease delivery of the vapor 114 to the nozzles 116 when the section 154 of the conduit 118 is moved away from the layer of build material particles 106. The controller 156 may additionally or in other examples cease delivery of the vapor 114 to the nozzles 116 when the pressure inside the chamber 112 reaches a certain level.

The apparatus 150 may further include a liquid collection system 170 to collect liquid from a bottom of the chamber 112 and a vapor collection system 180 to collect excess vapor 114 from the chamber 112. The liquid collection system 170 may collect vapor 114 that has condensed and reached the bottom of the chamber 112. The liquid collection system 170 may direct the collected liquid to a location at which the collected liquid may be discarded as indicated by the arrow 172. In addition or other examples, the arrow 172 may denote the return of the collected liquid to the vapor source 120. The vapor collection system 180 may collect excess vapor 114 from a ceiling of the chamber 112. The vapor collection system 180 may include a valve (not shown) to control the volume of vapor 114 collected from the chamber 112. The vapor collection system 180 may be implemented to remove vapor 114 from the chamber 112, for example, in instances in which the pressure inside the chamber 112 exceeds a predetermined pressure level through control of a valve (not shown). The vapor collection system 180 may direct collected vapor 114 may direct the collected vapor 114 to a location at which the collected vapor 114 may be discarded as indicated by the arrow 182. In addition or other examples, the arrow 182 may denote the return of the collected vapor 114 to the vapor source 120. In one regard, the vapor 114 and/or the condensed vapor 114 may be collected and removed from the chamber 112 and may be re-used in the chamber 112. Although not shown, a pump or pumps may be provided to assist in moving the vapor 114 and/or condensed vapor 114 away from the chamber 112.

Figure 2:
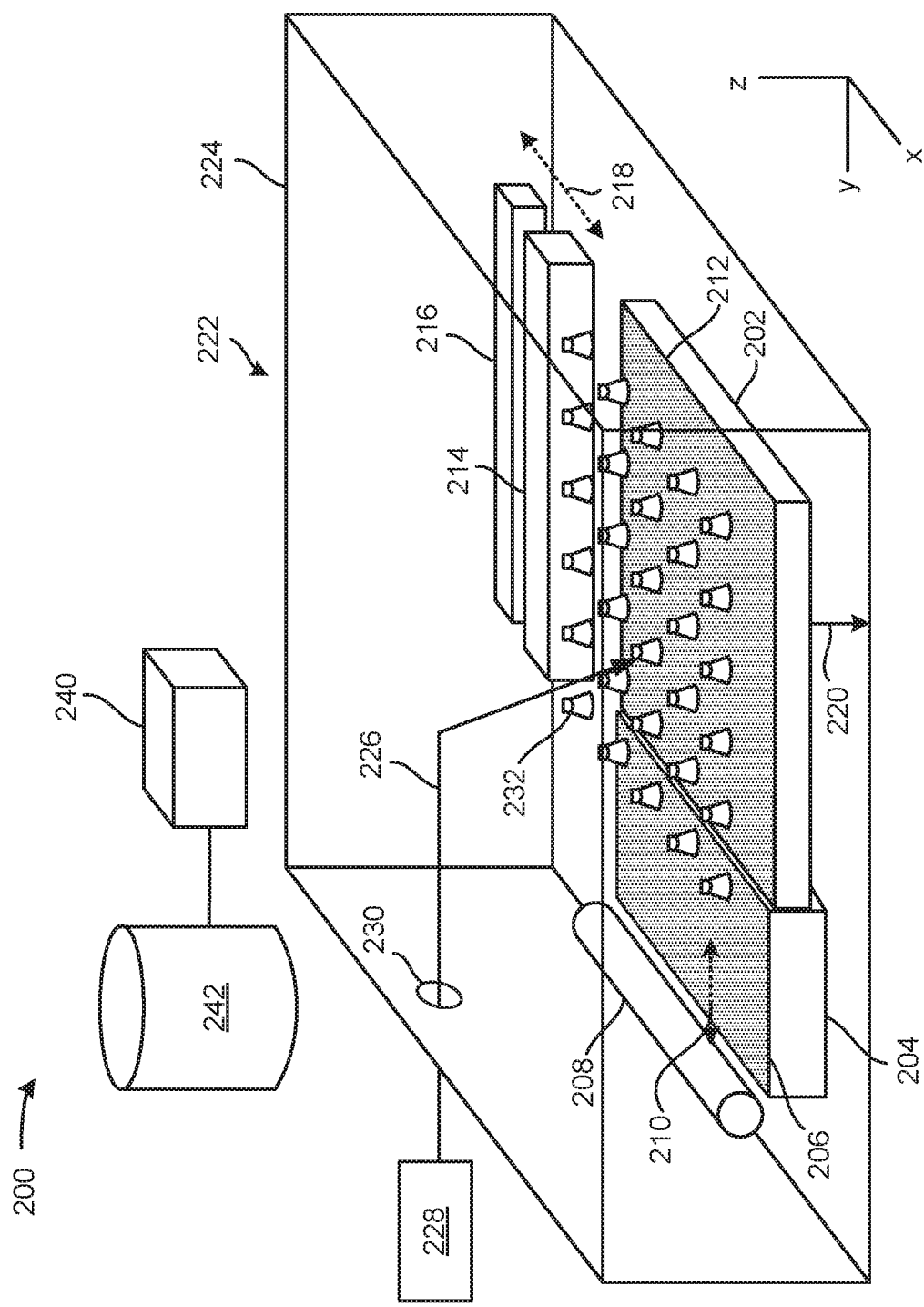
FIG. 2 shows a simplified block diagram of an example three-dimensional (3D) printer that may include printing components and a vapor supply system.

With reference now to FIG. 2, there is shown a simplified block diagram of an example three-dimensional (3D) printer 200 that may include printing components and a vapor supply system. It should be understood that the 3D printer 200 may include additional components and that some of the components described herein may be removed and/or modified without departing from a scope of the 3D printer 200 disclosed herein.

The 3D printer 200 may include a build area platform 202, a build material supply 204 containing build material particles 206, and a recoater 208. The build material supply 204 may be a container or surface that is to position build material particles 206 between the recoater 208 and the build area platform 202. Generally speaking, 3D objects or parts are to be generated from the build material particles 206 and the build material particles 206 may be formed of any suitable material including, but not limited to, polymers, metals, and ceramics. In addition, the build material particles 206 may be in the form of a powder and may thus also be considered to be build material powder 206.

The recoater 208 may move in a direction as denoted by the arrow 210, e.g., along the y-axis, over the build material supply 204 and across the build area platform 202 to spread a layer 212 of the build material particles 206 over a surface of the build area platform 202. The recoater 208 may also be returned to a position adjacent the build material supply 204 following the spreading of the build material particles 206. The recoater 208 may be a doctor blade, roller, a counter rotating roller or any other device suitable for spreading the build material particles 206 over the build area platform 202. According to examples, the build area platform 202 may be heated to apply heat onto spread layers 212 of the build material particles 206.

According to examples, the 3D printer 200 may include an agent delivery device 214 and an energy source 216, which may both be scanned across the build area platform 202 in both of the directions indicated by the arrow 218, e.g., along the x-axis. The agent delivery device 214 may be, for instance, a thermal inkjet printhead, a piezoelectric printhead, or the like, and may extend a width of the build area platform 202. The agent delivery device 214 may be equivalent to the agent delivery device 102 discussed above. In other examples in which the agent delivery device 214 does not extend the width of the build area platform 202, the agent delivery device 214 may also be scanned along the y-axis to thus enable the agent delivery device 214 to be positioned over a majority of the area above the build area platform 202. The agent delivery device 214 may be attached to a moving XY stage or a translational carriage (neither of which is shown) that is to move the agent delivery device 214 adjacent to the build area platform 202 in order to deposit the agent or agents in predetermined areas of a layer of the build material particles 206. Various examples of the agents are discussed above.

Following deposition of the agent onto selected areas of the layer 212 of the build material particles 206, the energy source 216 may be implemented to apply fusing radiation onto the build material particles 206 in the layer 212. Particularly, for instance, the energy source 216 may be activated and moved across the layer 212, for instance, along the directions indicated by the arrow 218, to apply fusing radiation in the form of light and/or heat onto the build material particles 206. The energy source 216 may be equivalent to the energy source 108 discussed above with respect to FIGS. 1A and 1B. According to examples, the agent delivery device 214 and the energy source 216 may be supported on a carriage (not shown) that may be scanned over the build area platform 202 in the directions denoted by the arrow 218.

In other examples, the agent delivery device 214 may be omitted and the energy source 216 may directly fuse the build material particles 206 in a selective manner. In these examples, the energy source 216 may emit a laser beam onto the build material particles 206 in selected locations of the layer 212 to selectively fuse the build material particles 206 in those selected locations. In this regard, the 3D printer 200 may perform selective laser sintering (SLS), selective laser melting (SLM), electron-beam melting (EBM), Selective Inhibition Sintering (SIS), or the like. Generally speaking, the 3D printer 200 may perform 3D printing using any suitable powder-based fusing techniques.

In any of the examples above, following application of the energy, e.g., radiation, to fuse selected sections of the build material particles 206 together, the build area platform 202 may be lowered as denoted by the arrow 220, e.g., along the z-axis. In addition, the recoater 208 may be moved across the build area platform 202 to form a new layer 212 of build material particles 206 on top of the previously formed layer. Moreover, another build material particle 206 fusing operation may be performed on the new layer 212. The above-described process may be repeated until a predetermined number of layers have been formed to fabricate a green body of a desired 3D part.

According to examples, the build area platform 202, the recoater 208, and the energy source 216 may be housed within a chamber 222 formed of a plurality of walls 224. A mechanism (not shown) to move the build area platform 202 may be contained inside the chamber 222 and/or may extend through a wall 224 of the chamber 222. The chamber 222 may be similar to the chamber 112 depicted in FIGS. 1A and 1B. In addition, vapor may be delivered through a conduit (represented by the arrow 226) into the chamber 222 from a vapor source 228 through an opening 230 in one of the walls 224 of the chamber 222. The conduit 226 may supply the vapor to a plurality of nozzles 232 that may be positioned above the build area platform 202 in any suitable manner. The nozzles 232 may be positioned in manners similar to those discussed above with respect to FIGS. 1A and 1B. As such, the nozzles 232 may be stationary or may be movable and may supply vapor onto the build material particles 206 in the layer 212. In addition, the vapor source 228 may include a compressor and/or a valve as discussed above with respect to FIGS. 1A and 1B. Moreover, a liquid collection system 170 and/or a vapor collection system 180 as shown in FIG. 1B may be connected to the chamber 222.

As further shown in FIG. 2, the 3D printer 200 may include a controller 240 that may control operations of the build area platform 202, the build material supply 204, the recoater 208, the agent delivery device 214, the energy source 216, and the vapor source 228. The controller 240 may also control operations of a compressor and/or valve. The controller 240 may control actuators (not shown) to control various operations of the 3D printer 200 components and the vapor supply system (e.g., the vapor source 228, the valve, the nozzles, etc.). The controller 240 may be a computing device, a semiconductor-based microprocessor, a central processing unit (CPU), an application specific integrated circuit (ASIC), a graphics processing unit (GPU), a field programmable gate array (FPGA), and/or other hardware device. Although not shown, the controller 240 may be connected to the 3D printer 200 components and the vapor supply system via communication lines.

The controller 240 may be in communication with a data store 242. The data store 242 may include data pertaining to a 3D part to be printed by the 3D printer 200. For instance, the data may include the locations in each build material layer 212 that are to be fused together to form the green body of the 3D part. In one example, the controller 240 may use the data to control the locations on each of the build material layers 212 that the agent delivery device 214 deposits the agent. Additionally, the controller 240 may control when the vapor is delivered into the chamber 222.

Figure 3:
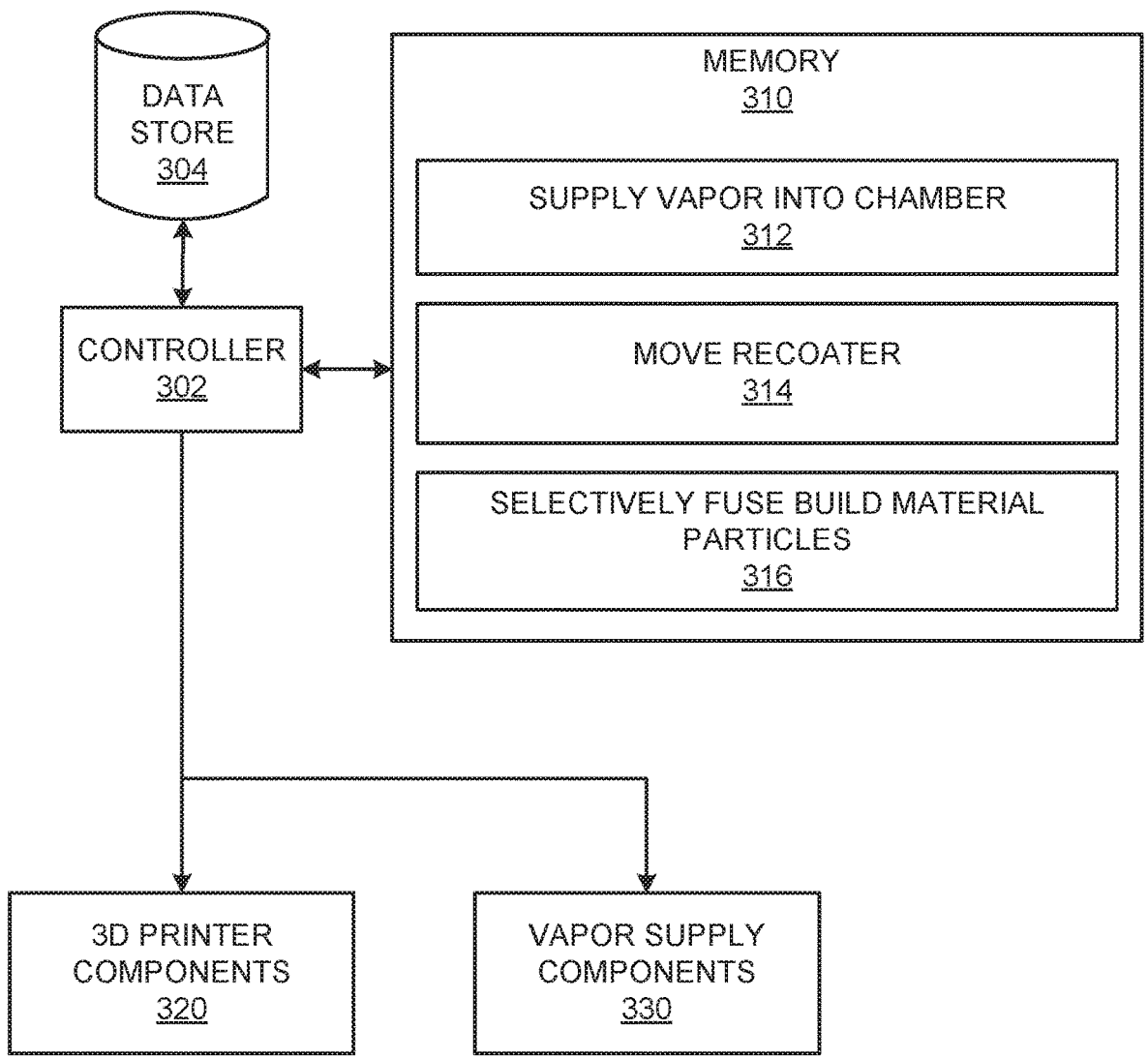
FIG. 3 shows a simplified block diagram of another example apparatus that may be implemented to supply vapor during a 3D part forming process.

Turning now to FIG. 3, there is shown a simplified block diagram of another example apparatus 300 that may be implemented to supply vapor during a 3D part forming process. It should be understood that the apparatus 300 depicted in FIG. 3 may include additional components and that some of the components described herein may be removed and/or modified without departing from a scope of the apparatus 300 disclosed herein.

The apparatus 300 may include a controller 302 that may control operations of the apparatus 300 and a data store 304 that may store data that is accessible by the controller 302. The controller 302 may be a semiconductor-based microprocessor, a central processing unit (CPU), an application specific integrated circuit (ASIC), field-programmable gate array (FPGA), a graphics processing unit (GPU), and/or other hardware device. The apparatus 300 may also include a memory 310 that may have stored thereon machine readable instructions 312-316 (which may also be termed computer readable instructions) that the controller 302 may execute. The memory 310 may be an electronic, magnetic, optical, or other physical storage device that contains or stores executable instructions. The memory 310 may be, for example, Random Access Memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The apparatus 300 may be a computing device such as a personal computer, a laptop computer, a smartphone, a server computer, a tablet computer, or the like. In other examples, the apparatus 300 may be or form part of a 3D printer. The controller 302 may communicate instructions to 3D printer components 320 and vapor supply components 330 over a network, through a wired connection, a bus, or the like. The 3D printer components 320 may include the components shown in the 3D printer 200 depicted in FIG. 2, such as a build area platform 202, a recoater 208, an energy source 216, etc. The vapor supply components 330 may also include the components shown in the 3D printer 200 depicted in FIG. 2, such as a vapor source 228, a valve, nozzles 232, etc. As discussed above with respect to FIG. 2, the 3D printer components 320 may be housed in a chamber 222.

With reference to FIGS. 1A-3, the controller 302 may fetch, decode, and execute the instructions 312 to supply vapor into the chamber 222. That is, for instance, the controller 302 may activate the vapor source 228, open a valve 160, open the nozzles 116, 118, or the like, to supply vapor into the chamber 222. The controller 302 may fetch, decode, and execute the instructions 314 to move the recoater 208 over a build area platform 202 to form a layer 212 of build material particles 206. According to examples, the vapor may be supplied directly onto a layer 212 of build material particles 206 or generally into the chamber 222. The controller 302 may fetch, decode, and execute the instructions 316 to selectively fuse the build material particles 206 in the formed layer 212. That is, for instance, the controller 302 may control the energy source 216 to apply energy onto the build material particles 206 in selected areas of the layer 212. In addition or in other examples, the controller 302 may control the agent delivery device 214 to deliver an agent to the build material particles 206 in selected areas of the layer 212 and the energy source 216 to apply energy onto the layer 212 of build material particles 206.

Figure 4:
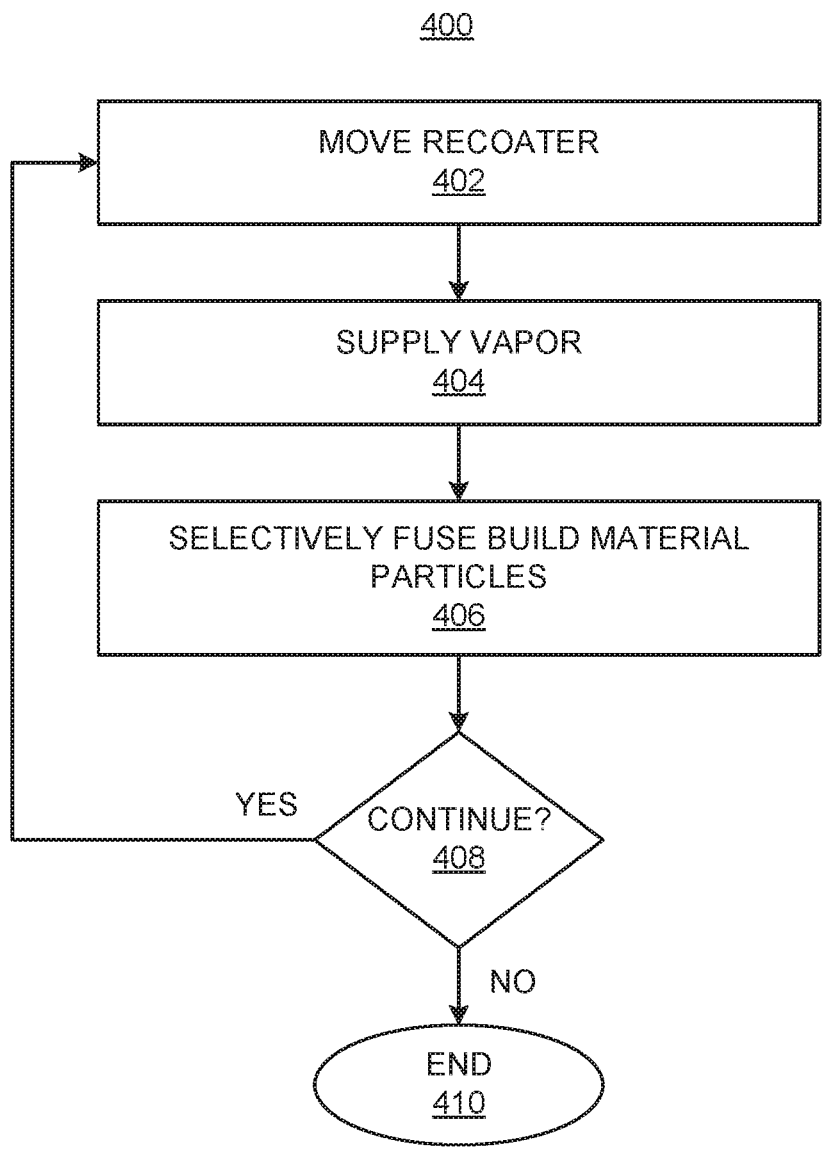
FIG. 4 depicts a flow diagram of an example method for printing a 3D object from build material particles in a chamber supplied with vapor.

Various manners in which the apparatus 300 may be implemented are discussed in greater detail with respect to the method 400 depicted in FIG. 4. Particularly, FIG. 4 depicts a flow diagram of an example method 400 for printing a 3D object from build material particles in a chamber supplied with vapor. It should be understood that the method 400 depicted in FIG. 4 may include additional operations and that some of the operations described therein may be removed and/or modified without departing from the scope of the method 400. The description of the method 400 is made with reference to the features depicted in FIGS. 1A-3 for purposes of illustration. Generally speaking, the controller 302 of the apparatus 300 may implement or execute some or all of the instructions 312-316 stored on the memory 310 to perform the method 400. However, it is contemplated that other computing devices may implement or perform the operations described with respect to the method 400.

At block 402, a recoater 208 may be moved over a build area platform 202 to form a layer 212 of build material particles 206. The recoater 208 and the build area platform 202 may be housed in chamber 112, 222. In other examples, an agent delivery device 214, and the like, may also be housed in the chamber 112, 222.

At block 404, vapor 114 may be supplied into the chamber 112, 222, in which the vapor 114 is to wet the layer 212 of build material particles 206. The chamber 112, 222 may house a recoater 208 and an energy source 216. The vapor 114 may be supplied into the chamber 112, 222 and in some examples, directly onto the build material particles 206 in any of the manners discussed above.

At block 406, the build material particles 206 in the layer 212 may be selectively fused. That is, the build material particles 206 in certain locations of the layer 212 that are to form sections of a 3D printed part may be fused together. As discussed above, the build material particles 206 in the certain locations may be fused together through application of fusing energy onto the build material particles 206. Application of the fusing energy may be with or without prior application of the agent as also discussed above.

At block 408, a determination may be made as to whether the method 400 is to continue. A determination to continue the method 400 may be made if build material particles 206 in additional layers 212 are to be fused together to form the 3D part. In response to a determination that the method 400 is to continue, blocks 402-408 may be repeated to selectively fuse the build material particles 206 in additional layers 212 while being supplied with vapor 114. In response to a determination that the method 400 is not to be continued, the method 400 may end as indicated at block 410.

Some or all of the operations set forth in the method 400 may be contained as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    an agent delivery device to selectively deliver an agent onto a layer of build material particles;
    an energy source to apply energy onto the layer of build material particles to selectively fuse the build material particles in the layer based upon the locations at which the agent was delivered;
    a chamber formed of a plurality of walls, wherein the agent delivery device and the energy source are housed inside the chamber;
    a water vapor source to supply water vapor concurrently onto substantially an entire area of the layer of build material particles inside of the chamber to wet the build material particles inside the chamber with the water vapor; and
    a controller to:
        control a recoater to form the layer of build material particles;
        in response to formation of the layer of build material particles, control the water vapor source to supply the water vapor onto the layer of build material particles;
        control the water vapor source to stop supply of the water vapor; and
        in response to the supply of the water vapor being stopped, control the agent delivery device to selectively deliver the agent onto the build material particles in the layer of build material particles.

2. The apparatus according to claim 1, wherein the vapor source further comprises a plurality of nozzles that are to spray the water vapor directly onto the layer of build material particles.

3. The apparatus according to claim 1, further comprising:
a valve to variably control delivery of the water vapor into the chamber from the vapor source, wherein the controller is to control the valve.

4. The apparatus according to claim 1, further comprising:
the recoater to spread the build material particles into the layer of build material particles prior to delivery of the agent onto the layer of build material particles, wherein the recoater is housed inside the chamber.

5. The apparatus according to claim 1, wherein the build material particles are maintained at a certain temperature prior to application by the energy source of energy onto the build material particles and wherein the vapor source is to supply the water vapor at a temperature that is near the certain temperature.

6. The apparatus according to claim 1, wherein the water vapor source includes a compressor to pressurize the water vapor being supplied into the chamber.

7. The apparatus according to claim 1, further comprising:
a liquid collection system to collect liquid from the chamber; and
a vapor collection system to collect excess water vapor from the chamber.

8. The apparatus according to claim 1, wherein the water vapor is composed of particles of a non-caustic and non-corrosive material.

9. A three-dimensional (3D) printer comprising:
a build area platform;
a recoater to spread build material powder into layers over the build area platform;
an energy source to apply energy onto the spread layers of build material powder to selectively fuse the build material particles and fabricate a 3D object;
a water vapor source to supply water vapor onto substantially an entire area of a layer of the layers of spread build material powder;
a chamber formed of a plurality of walls, wherein the build area platform, the recoater, and the energy source are housed inside the chamber, and wherein the chamber is to receive the water vapor from the vapor source and the water vapor is to wet the build material powder inside the chamber during fabrication of the 3D object; and
a controller to:
control the recoater to form a layer of build material particles;
responsive to formation of the layer of build material particles, control the water vapor source to supply the water vapor onto the layer of build material particles;
control the water vapor source to stop supply of the water vapor; and
responsive to the supply of the water vapor being stopped, controlling an agent delivery device to selectively deliver the agent onto the build material particles.

10. The 3D printer according to claim 9, further comprising:
the agent delivery device to selectively deposit the agent onto the formed layers of build material powder, wherein application of energy by the energy source is to selectively fuse the build material powder based upon the locations at which the agent has been deposited.

11. The 3D printer according to claim 9, further comprising:
a plurality of nozzles positioned to supply the received water vapor directly onto the spread layers of build material powder.

12. The 3D printer according to claim 9, wherein the chamber is sealed from an ambient environment outside of the chamber.

13. An additive manufacturing method comprising:
controlling, by a controller, a recoater to move over a build area platform to form a layer of build material particles, wherein the recoater and the build area platform are housed in a chamber formed of a plurality of walls;
in response to formation of the layer of build material particles, controlling, by the controller, a water vapor source to supply water vapor onto substantially an entire area of the layer of build material particles;
controlling, by the controller, the water vapor source to stop the supply of water vapor onto the layer of build material particles;
responsive to stopping of the supply of water vapor, controlling, by the controller, an agent delivery device to selectively deliver an agent onto the layer of build material particles; and
causing, by the controller, an energy source to be moved over the layer of build material particles within the chamber to selectively fuse the build material particles in the layer.

14. The method according to claim 13, further comprising controlling the recoater to move over the build area platform to form a plurality of build material particle layers, and controlling the water vapor source to supply water vapor onto the plurality of build material particle layers between formation of successive build material particle layers.

15. The method according to claim 13, wherein controlling the water vapor source to supply water vapor onto the layer of build material particles further comprises controlling the water vapor source to spray the water vapor directly onto the layer of build material particles.

* * * * *